United States Patent
Jang

(10) Patent No.: US 11,513,726 B2
(45) Date of Patent: Nov. 29, 2022

(54) STORAGE DEVICE AND METHOD OF OPERATING THE SAME

(71) Applicant: SK hynix Inc., Icheon-si (KR)

(72) Inventor: Jae Youn Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/212,010

(22) Filed: Mar. 25, 2021

(65) Prior Publication Data

US 2022/0100419 A1   Mar. 31, 2022

(30) Foreign Application Priority Data

Sep. 28, 2020   (KR) .................. 10-2020-0125706

(51) Int. Cl.
*G06F 3/06*   (2006.01)
(52) U.S. Cl.
CPC ............ *G06F 3/0656* (2013.01); *G06F 3/064* (2013.01); *G06F 3/0619* (2013.01); *G06F 3/0659* (2013.01); *G06F 3/0673* (2013.01)
(58) Field of Classification Search
CPC ...... G06F 3/0656; G06F 3/0619; G06F 3/064; G06F 3/0659; G06F 3/0673
See application file for complete search history.

(56) References Cited

U.S. PATENT DOCUMENTS

| 2006/0212661 | A1* | 9/2006 | Inagaki | G06F 13/1673 |
| | | | | 711/147 |
| 2017/0147209 | A1* | 5/2017 | Lee | G06F 3/0659 |
| 2019/0188125 | A1* | 6/2019 | Lin | G06F 12/1009 |
| 2020/0042243 | A1* | 2/2020 | Lee | G06F 3/0659 |

FOREIGN PATENT DOCUMENTS

| KR | 10-2017-0130657 A | 11/2017 |
| KR | 10-2020-0010933 A | 1/2020 |

* cited by examiner

*Primary Examiner* — Zhuo H Li

(57) ABSTRACT

A storage device includes a memory device including a plurality of zones, each of the plurality of zones having a plurality of memory blocks, a buffer memory device including a host buffer receiving write data to be stored in one of the plurality of zones, and a memory buffer temporarily storing the write data transmitted from the host buffer, a buffer controller configured to control the buffer memory device to transmit the write data to the memory device, and a write operation controller configured to control the memory device to store the write data in the one of the plurality of one zones. The write operation controller controls the memory device to obtain the previously stored data and a corrected write data and to store the previously stored data and the corrected write data in a second memory block group after the write operation controller detects an error in the write data.

17 Claims, 14 Drawing Sheets

STORAGE DEVICE AND METHOD OF OPERATING THE SAME

CROSS-REFERENCE TO RELATED APPLICATION

The present application claims priority under 35 U.S.C. § 119(a) to Korean patent application number 10-2020-0125706, filed on Sep. 28, 2020, in the Korean Intellectual Property Office, the entire disclosure of which is incorporated herein by reference.

BACKGROUND

1. Field of Invention

The present disclosure relates to an electronic device, and more particularly, to a storage device and a method of operating the same.

2. Description of Related Art

A storage device is a device that stores data under control of a host such as a computer or a smartphone. The storage device may include a memory device in which data is stored and a memory controller for controlling the memory device. A memory device may be described as a volatile memory device and a nonvolatile memory device.

A volatile memory device is a memory device that stores data only when power is supplied and loses the stored data when the power supply is cut off. Examples of a volatile memory device include a static random access memory (SRAM), a dynamic random access memory (DRAM), and the like.

A nonvolatile memory device is a device that does not lose data even though power is cut off. Examples of a nonvolatile memory device include a read only memory (ROM), a programmable ROM (PROM), an electrically programmable ROM (EPROM), an electrically erasable and programmable ROM (EEPROM), a flash memory, and the like.

SUMMARY

Embodiments of the present disclosure provide improved methods of operating a storage device by utilizing a zoned name space.

A storage device according to an embodiment of the present disclosure may include a memory device including a plurality zones, each of the plurality of zones having a plurality of memory blocks that forms a memory block group, a buffer memory device including a host buffer, receiving write data from a host to be stored in one of the plurality of zones, and a memory buffer temporarily storing the write data transmitted from the host buffer, a buffer controller configured to control the buffer memory device to transmit the write data from the memory buffer to the memory device, and a write operation controller configured to control the memory device to store the write data transmitted from the buffer memory device in the one of the plurality of zones, which includes a previously stored data in a first memory block group. The write operation controller may control the memory device to obtain the previously stored data and a corrected write data and to store the previously stored data and the corrected write data in a second memory block group after the write operation controller detects an error in the write data.

A method of operating a storage device including a memory device including a plurality of memory blocks allocated to a plurality of zones according to an embodiment of the present disclosure may include receiving a write request including a write data from a host, temporarily storing the write data transmitted from the host, sequentially storing the temporarily stored write data in one of the plurality of zones in the memory device, determining whether an error is generated while the write data is moved, and performing a recovery operation when an error is generated.

According to the present technology, an improved operation method of a storage device including a zoned name space is provided.

DETAILED DESCRIPTION

Specific structural or functional descriptions of embodiments according to the concepts which are disclosed in the present specification or application are illustrated only to describe the embodiments according to the concepts of the present disclosure. The embodiments according to the concepts of the present disclosure may be carried out in various forms and the descriptions are not limited to the embodiments described in the present specification or application.

Hereinafter, embodiments of the present disclosure will be described in detail with reference to the accompanying drawings, so that those skilled in the art to which the present disclosure pertains may easily carry out the technical spirit of the present disclosure.

Figure 1:
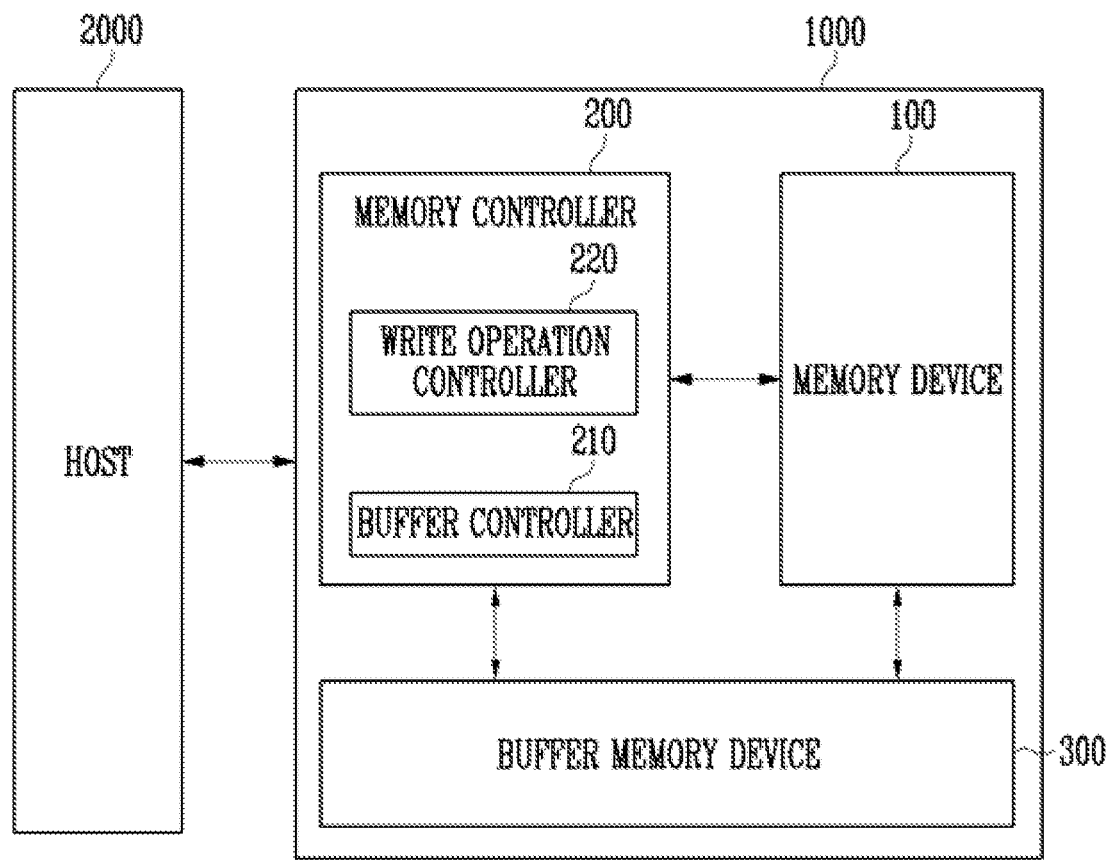
FIG. 1 is a block diagram illustrating a storage device according to an embodiment of the present disclosure.

FIG. 1 is a block diagram illustrating a storage device according to an embodiment of the present disclosure.

Referring to FIG. 1, a storage device 1000 may include a memory device 100, a memory controller 200, and a buffer memory device 300.

The storage device 1000 may be a device that stores data under control of a host 2000 such as, for example, a cellular phone, a smartphone, an MP3 player, a laptop computer, a desktop computer, a game player, a display device, a tablet PC, or an in-vehicle infotainment system.

The storage device 1000 may be implemented as one of various types of storage devices according to a host interface that is a communication method with the host 2000. For example, the storage device 1000 may be implemented as any one of various types of storage devices such as a solid state drive (SSD), a multimedia card in a form of an MMC, an embedded MMC (eMMC), an reduced size MMC (RS-MMC) and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 1000 may be implemented as any one of various types of packages. For example, the storage device 1000 may be implemented as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data or use the stored data. Specifically, the memory device 100 may operate in response to control of the memory controller 200. In addition, the memory device 100 may include a plurality of memory dies, and each of the plurality of memory dies may include a memory cell array that includes a plurality of memory cells storing data.

Each of the memory cells may be configured as a single level cell (SLC) that stores one data bit, a multi-level cell (MLC) that stores two data bits, a triple level cell (TLC) that stores three data bits, or a quad level cell (QLC) that stores four data bits.

The memory cell array may include a plurality of memory blocks. Each memory block may include a plurality of memory cells, and one memory block may include a plurality of pages. Here, a page may be one unit for storing data in the memory device 100 or reading the data stored in the memory device 100.

The memory device 100 may be implemented as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, it is assumed that the memory device 100 is a NAND flash memory.

The memory device 100 may receive a command and an address from the memory controller 200. The memory device 100 may be configured to access a region selected by the received address in the memory cell array. Accessing the selected region may mean performing an operation corresponding to the received command on the selected region. For example, the memory device 100 may perform a write operation (a program operation), a read operation, and an erase operation. Here, the program operation may be an operation in which the memory device 100 writes data to the region selected by the address. The read operation may mean an operation in which the memory device 100 reads data from the region selected by the address. The erase operation may mean an operation in which the memory device 100 erases data stored in the region selected by the address.

The memory controller 200 may control an overall operation of the storage device 1000.

The memory controller 200 may execute firmware (FW) when power is applied to the storage device 1000. The firmware (FW) may include a host interface layer (HIL) that receives a request input from the host 2000 or outputs a response to the host 2000, a flash translation layer (FTL) that manages an operation between an interface of the host 2000 and an interface of the memory device 100, and a flash interface layer (FIL) that provides a command to the memory device 100 or receives a response from the memory device 100.

The memory controller 200 may receive data and a logical address (LA) from the host 2000, and convert the LA into a physical address (PA) indicating an address of memory cells in which data included in the memory device 100 is to be stored. The LA may be a logical block address (LBA), and the PA may be a physical block address (PBA).

The memory controller 200 may control the memory device 100 to perform a program operation, a read operation, an erase operation, or the like according to the request of the host 2000. During the program operation, the memory controller 200 may provide a program command, a PBA, and data to the memory device 100. During the read operation, the memory controller 200 may provide a read command and a PBA to the memory device 100. During the erase operation, the memory controller 200 may provide an erase command and a PBA to the memory device 100.

The memory controller 200 may control the memory device 100 to perform the program operation, the read operation, or the erase operation by itself regardless of, or independent of, a request from the host 2000. For example, the memory controller 200 may control the memory device 100 to perform a program operation, a read operation, or an erase operation used to perform a background operation such as wear leveling, garbage collection, and read reclaim.

According to an embodiment of the present disclosure, the memory controller 200 may include a buffer controller 210 and a write operation controller 220.

The buffer controller 210 may control a buffer memory device 300 to process a write request provided from the host 2000. Specifically, the buffer controller 210 may control the buffer memory device 300 to transmit data stored in the buffer memory device 300 to the memory device 100 in order to process the write request provided from the host 2000. A detailed operation method of the buffer controller 210 is described later in detail with reference to FIG. 7.

The write operation controller 220 may control the memory device 100 to process the write request provided from the host 2000. Specifically, the write operation controller 220 may control the memory device 100 to perform a write operation corresponding to the write request provided from the host 2000. A detailed operation method of the write operation controller 220 is described later in detail with reference to FIG. 8.

The host 2000 may communicate with the storage device 1000 using at least one of various communication methods such as for example a universal serial bus (USB), a serial AT attachment (SATA), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
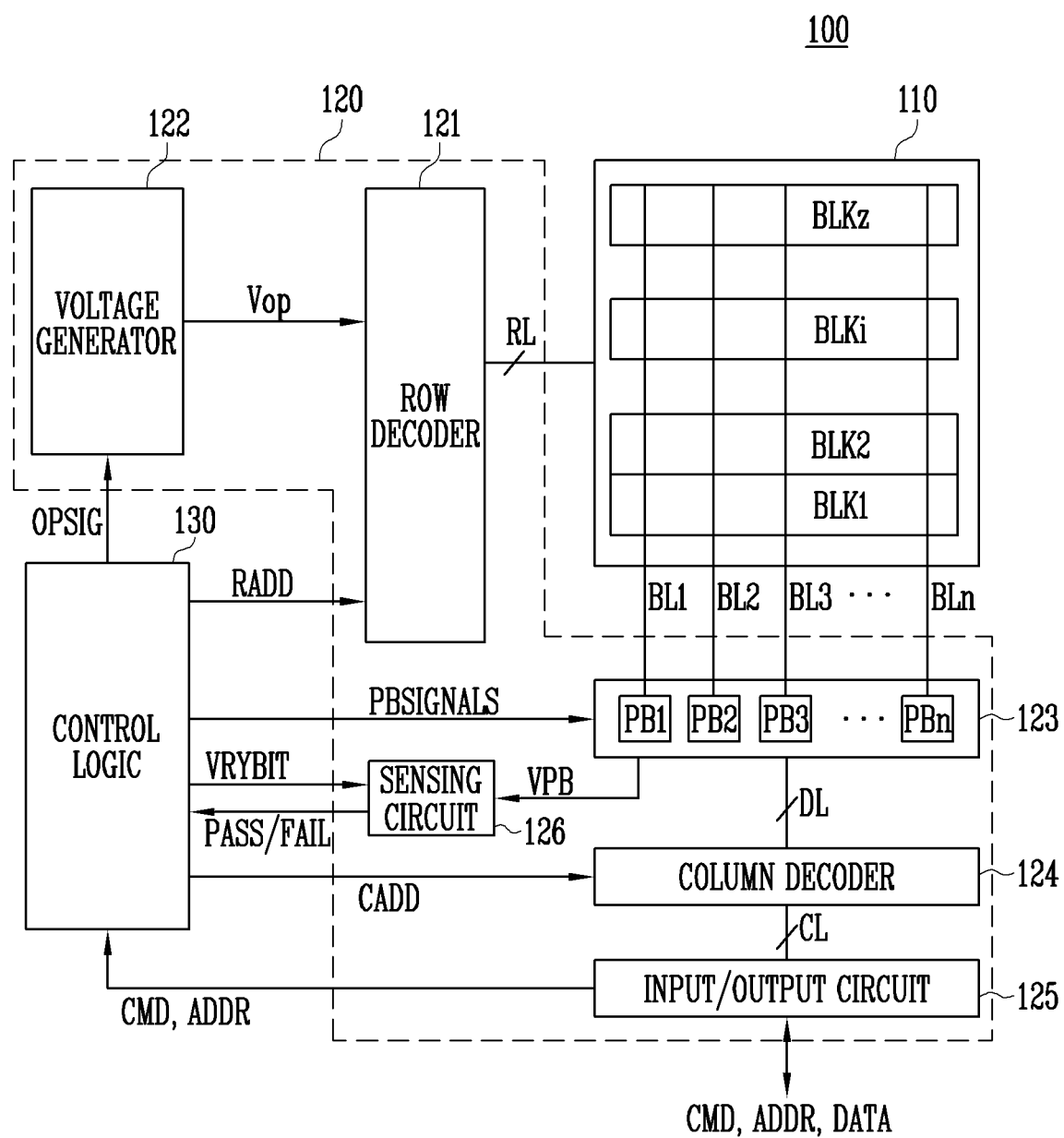
FIG. 2 is a block diagram illustrating a memory device according to an embodiment of the present disclosure.

FIG. 2 is a block diagram illustrating a memory device according to an embodiment of the present disclosure.

Referring to FIG. 2, a memory device 100 may include a memory cell array 110, a peripheral circuit 120, and a control logic 130.

The memory cell array 110 may include a plurality of memory blocks BLK1 to BLKz (where z is a positive integer). The plurality of memory blocks BLK1 to BLKz may be connected to a row decoder 121 through row lines RL. Here, the row lines RL may include at least one source select line, a plurality of word lines, and at least one drain select line. The plurality of memory blocks BLK1 to BLKz may be connected to a page buffer group 123 through bit lines BL1 to BLn (where n is a positive integer). Each of the plurality of memory blocks BLK1 to BLKz may include a plurality of memory cells. In an embodiment, the plurality of memory cells may be nonvolatile memory cells. Memory cells connected to the same word line may be defined as one page. Therefore, one memory block may include a plurality of pages.

Each of the memory cells included in the memory cell array 110 may be configured as a single level cell (SLC) that stores one data bit, a multi-level cell (MLC) that stores two data bits, a triple level cell (TLC) that stores three data bits, or a quad level cell (QLC) that stores four data bits.

The peripheral circuit 120 may be configured to perform a program operation, a read operation, or an erase operation on a selected region of the memory cell array 110 under control of the control logic 130. That is, the peripheral circuit 120 may drive the memory cell array 110 under the control of the control logic 130. For example, the peripheral circuit 120 may apply various operation voltages to the row lines RL and the bit lines BL1 to BLn or discharge the applied voltages under the control of the control logic 130.

Specifically, the peripheral circuit 120 may include the row decoder 121, a voltage generator 122, the page buffer group 123, a column decoder 124, an input/output circuit 125, and a sensing circuit 126.

The row decoder 121 may be connected to the memory cell array 110 through the row lines RL. The row lines RL may include at least one source select line, a plurality of word lines, and at least one drain select line. In an embodiment, the word lines may include normal word lines and dummy word lines. In addition, the row lines RL may further include a pipe select line.

The row decoder 121 may be configured to operate in response to the control of the control logic 130. The row decoder 121 may receive a row address RADD from the control logic 130. Specifically, the row decoder 121 may be configured to decode the row address RADD. The row decoder 121 may select at least one of the memory blocks BLK1 to BLKz according to a decoded address. In addition, the row decoder 121 may select at least one word line of the memory block selected to apply the voltages generated by the voltage generator 122 to at least one word line WL according to the decoded address.

For example, during the program operation, the row decoder 121 may apply a program voltage to a selected word line and apply a program pass voltage of a level lower than that of the program voltage to an unselected word line. During a program verify operation, the row decoder 121 may apply a verify voltage to the selected word line and a verify pass voltage higher than the verify voltage to an unselected word line. During the read operation, the row decoder 121 may apply a read voltage to the selected word line and apply a read pass voltage higher than the read voltage to the unselected word line.

In an embodiment, an erase operation of the memory cell array 110 may be performed in a memory block unit. During the erase operation, the row decoder 121 may select one memory block according to the decoded address, and the row decoder 121 may apply a ground voltage to word lines connected to the selected memory block.

The voltage generator 122 may operate in response to the control of the control logic 130. The voltage generator 122 may be configured to generate a plurality of voltages using an external power voltage supplied to the memory device 100. For example, the voltage generator 122 may generate the program voltage, the verify voltage, the pass voltage, the read voltage, the erase voltage, and the like under the control of the control logic 130. That is, the voltage generator 122 may generate various operation voltages Vop used for the program, read, and erase operations in response to an operation signal OPSIG.

In an embodiment, the voltage generator 122 may generate an internal power voltage by regulating the external power voltage. The internal power voltage generated by the voltage generator 122 may be used as an operation voltage of the memory cell array 110.

In an embodiment, the voltage generator 122 may generate a plurality of voltages using the external power voltage or the internal power voltage. For example, the voltage generator 122 may include a plurality of pumping capacitors that receive the internal power voltage, and may selectively activate the plurality of pumping capacitors to generate the plurality of voltages, in response to the control of the control logic 130. In addition, the generated voltages may be supplied to the memory cell array 110 by the row decoder 121.

The page buffer group 123 may include first to n-th page buffers PB1 to PBn. The first to n-th page buffers PB1 to PBn may be connected to the memory cell array 110 through the first to n-th bit lines BL1 to BLn, respectively. In addition, the first to n-th page buffers PB1 to PBn may operate in response to the control of the control logic 130. Specifically, the first to n-th page buffers PB1 to PBn may operate in response to page buffer control signals PBSIGNALS. For example, the first to n-th page buffers PB1 to PBn may temporarily store data received through the first to n-th bit lines BL1 to BLn, or may sense a voltage or a current of the bit lines BL1 to BLn during the read or verify operation.

Specifically, during the program operation, when a program pulse is applied to the selected word line, the first to n-th page buffers PB1 to PBn may transfer data DATA received through the data input/output circuit 125 to the selected memory cells through the first to n-th bit lines BL1 to BLn. The memory cells of the selected page may be programmed according to the transferred data DATA. Memory cells of a page selected according to the transferred data DATA may be programmed. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained.

During the program verify operation, the first to n-th page buffers PB1 to PBn may read page data from the selected memory cells through the first to n-th bit lines BL1 to BLn.

During the read operation, the first to n-th page buffers PB1 to PBn may read the data DATA from the memory cells of the selected page through the first to n-th bit lines BL1 to BLn, and output the read data DATA to the data input/output circuit 125 under control of the column decoder 124.

During the erase operation, the first to n-th page buffers PB1 to PBn may float the first to n-th bit lines BL1 to BLn.

The column decoder 124 may transfer data between the input/output circuit 125 and the page buffer group 123 in response to a column address CADD. For example, the column decoder 124 may exchange data with the first to n-th page buffers PB1 to PBn through data lines DL, or may exchange data with the input/output circuit 125 through column lines CL.

The input/output circuit 125 may transfer the command CMD and the address ADDR received from the memory controller 200 to the control logic 130, or may exchange the data DATA with the column decoder 124.

The sensing circuit 126 may generate a reference current in response to a permission bit signal VRYBIT during the read operation or the verify operation, and compare a sensing voltage VPB received from the page buffer group 123 with a reference voltage generated by the reference current to output a pass signal PASS or a fail signal FAIL.

The control logic 130 may output the operation signal OPSIG, the row address RADD, the page buffer control signals PBSIGNALS, and the permission bit signal VRYBIT in response to the command CMD and the address ADDR to control the peripheral circuit 120.

In addition, the control logic 130 may determine whether the verify operation is passed or failed in response to the pass signal PASS or the fail signal FAIL. In addition, the control logic 130 may control the page buffer group 123 to temporarily store verify information including the pass signal PASS or the fail signal FAIL in the page buffer group 123. Specifically, the control logic 130 may determine a program state of a memory cell in response to the pass signal PASS or the fail signal FAIL. For example, when the memory cell operates as a triple level cell (TLC), the control logic 130 may determine whether the program state of the memory cell is an erase state or any one of first to seventh program states.

Figure 3:
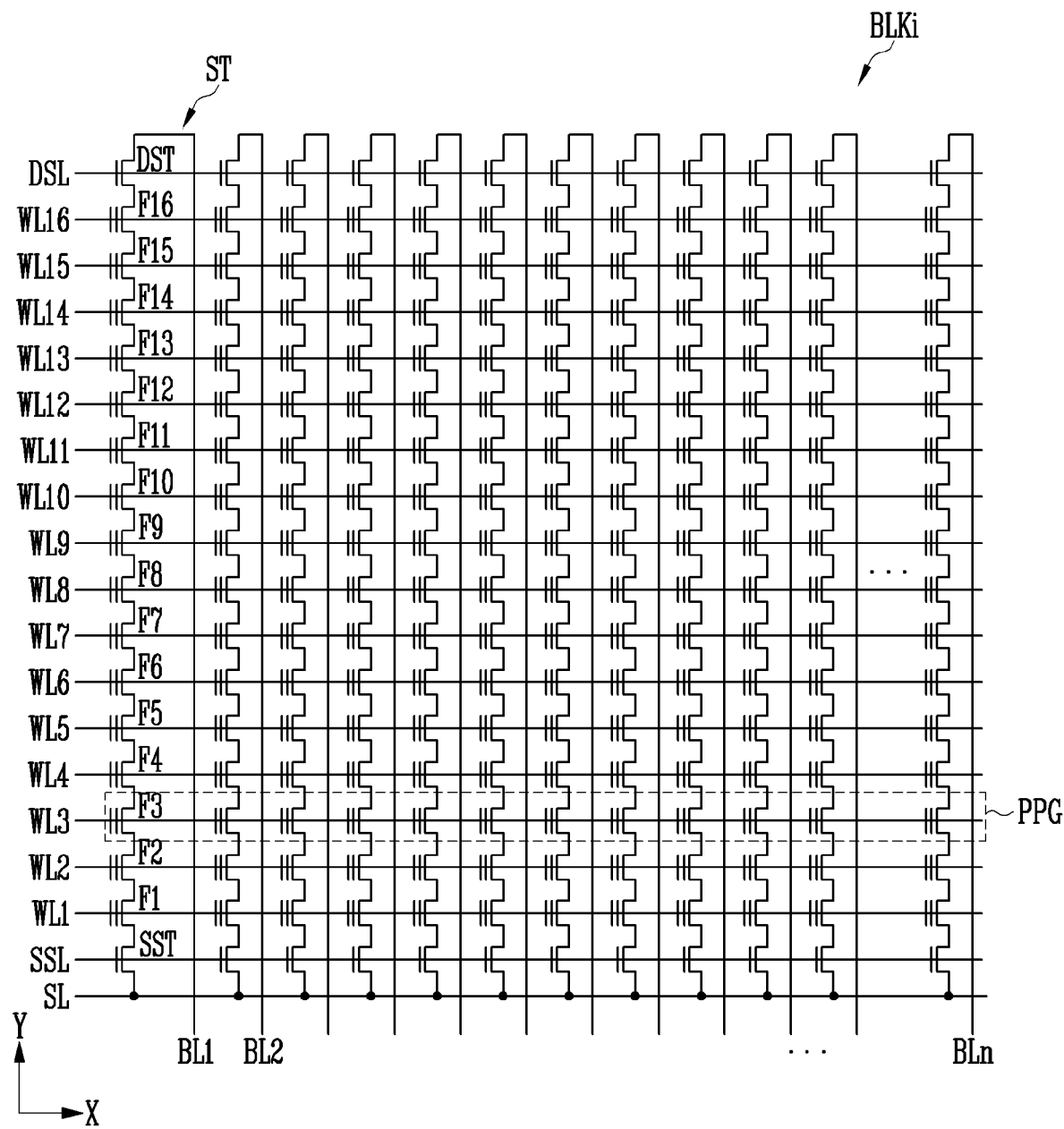
FIG. 3 is a diagram illustrating a memory block according to an embodiment of the present disclosure.

FIG. 3 is a diagram illustrating a memory block according to an embodiment of the present disclosure.

Referring to FIG. 3, in the memory block BLKi (where i is a positive integer), a plurality of word lines arranged in parallel with each other may be connected between a first select line and a second select line. Here, the first select line may be a source select line SSL, and the second select line may be a drain select line DSL. More specifically, the memory block BLKi may include a plurality of strings ST connected between bit lines BL1 to BLn and a source line SL. The bit lines BL1 to BLn may be connected to the strings ST, respectively, and the source line SL may be commonly connected to the strings ST. Because the strings ST may be configured to be identical to each other, a string ST connected to the first bit line BL1 is specifically described as an example.

The string ST may include a source select transistor SST, a plurality of memory cells F1 to F16, and a drain select transistor DST, which are connected in series between the source line SL and the first bit line BL1. One string ST may include at least one or more of the source select transistor SST and the drain select transistor DST, and may include the memory cells F1 to F16. In other embodiments, the number of memory cells may be more than the number shown in FIG. 3.

A source of the source select transistor SST may be connected to the source line SL and a drain of the drain select transistor DST may be connected to the first bit line BL1. The memory cells F1 to F16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells F1 to F16 may be connected, respectively, to the plurality of word lines WL1 to WL16. A group of the memory cells connected to the same word line from among the memory cells included in different strings ST may be referred to as a physical page (PPG). Therefore, the memory block BLKi may include the physical pages (PPG) of the number of the word lines WL1 to WL16.

Each of the memory cells may be configured as an SLC that stores one data bit, an MLC that stores two data bits, a TLC that stores three data bits, or a QLC capable of storing four data bits.

The SLC may store one bit of data. One physical page (PPG) of the SLC may store one logical page (LPG) data. One logical page (LPG) data may include data bits corresponding to the number of cells included in one physical page (PPG).

The MLC, the TLC, and the QLC may store two or more bits of data. In such cases, one physical page (PPG) may store two or more logical page (LPG) data.

Figure 4:
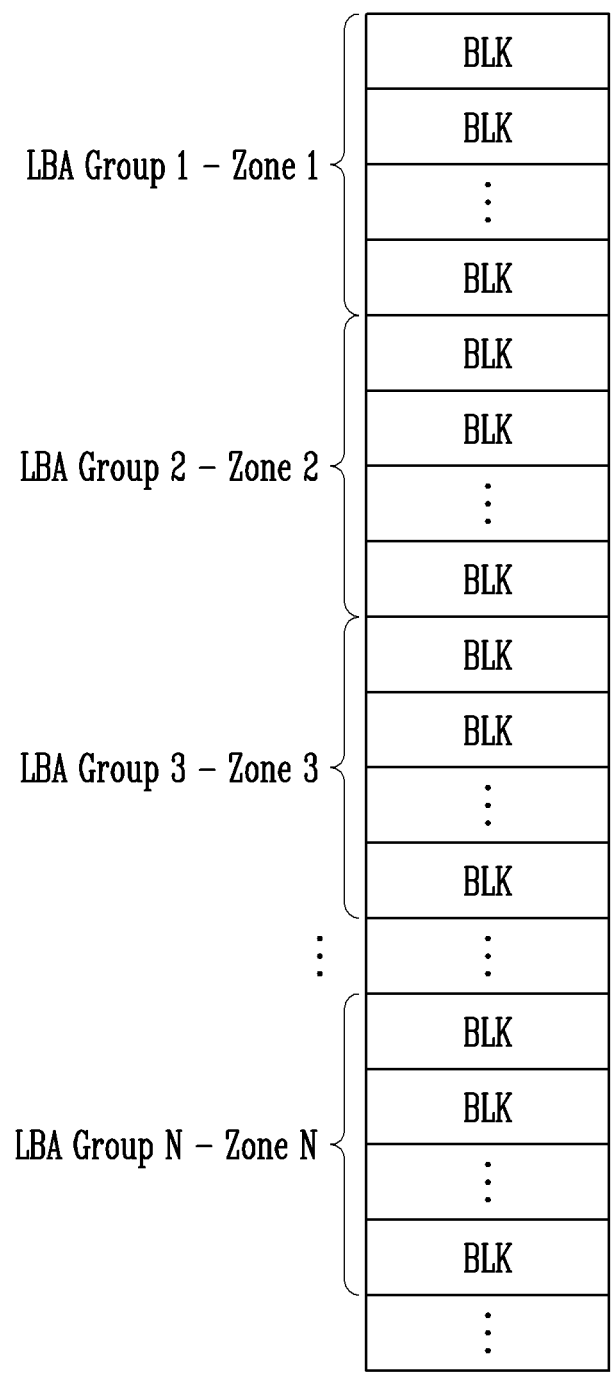
FIG. 4 is a diagram illustrating a zone according to an embodiment of the present disclosure.

FIG. 4 is a diagram illustrating a zone according to an embodiment of the present disclosure.

Referring to FIG. 4, each of a plurality of zones may include a plurality of memory blocks. Specifically, each of first to N-th zones Zone 1 to Zone N may include a plurality of memory blocks. The numbers of memory blocks included in each of the plurality of zones may be different from each other or may be the same across memory blocks. A zone may be a storage area corresponding to a logical address group configured of logical addresses. Specifically, the plurality of zones may be areas for storing data corresponding to corresponding logical address groups, respectively. For example, the first zone Zone 1 may be an area for storing data corresponding to a first logical address group LBA Group 1. In addition, the second zone Zone 2 may be an area for storing data corresponding to a second logical address group LBA Group 2. In addition, the third zone Zone 3 may be an area for storing data corresponding to a third logical address group LBA Group 3. The N-th zone Zone N may be an area for storing data corresponding to an N-th logical address group LBA Group N. Here, each of the logical address groups may include consecutive logical addresses. In an embodiment, each of the plurality of zones may also include a plurality of memory block groups.

Figure 5:
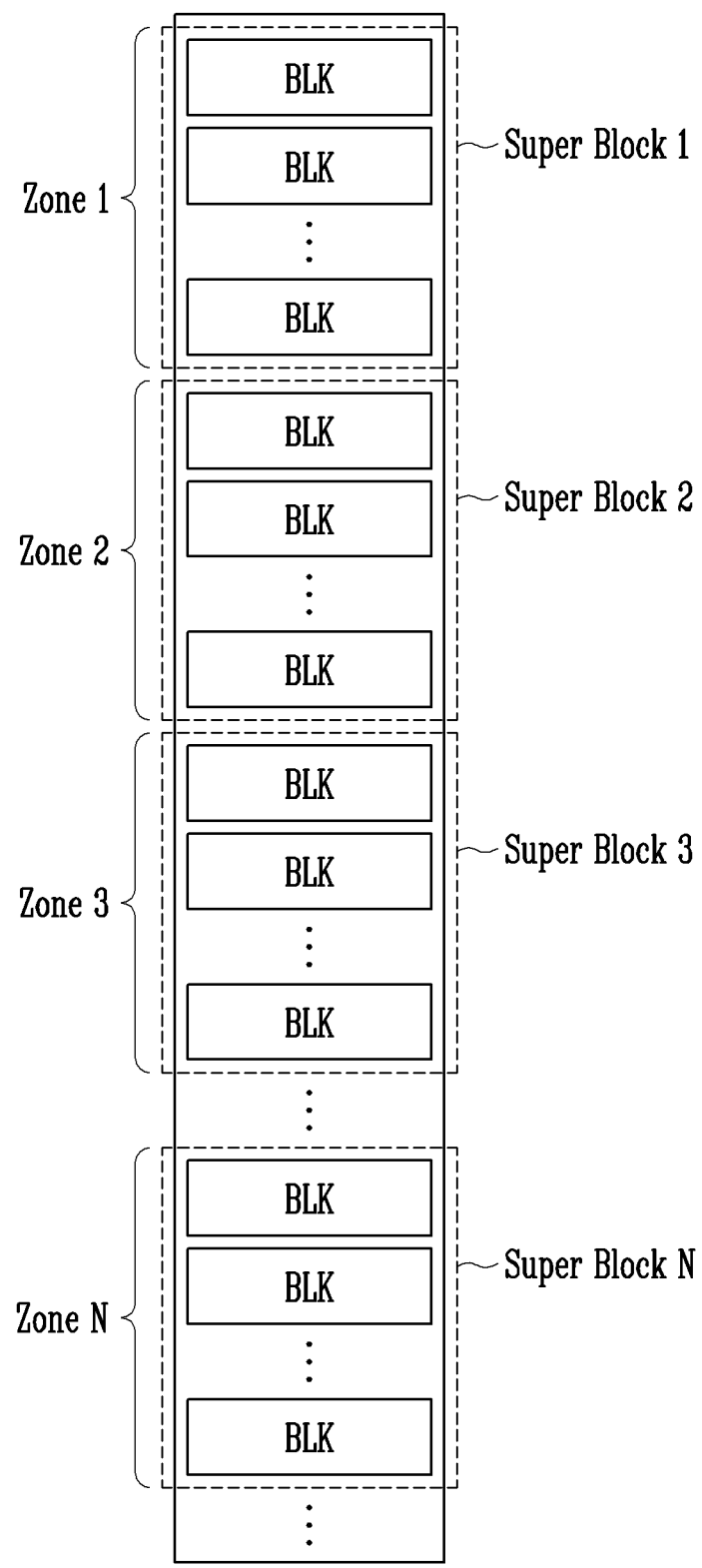
FIG. 5 is a diagram illustrating a relationship between a zone and memory blocks according to an embodiment of the present disclosure.

FIG. 5 is a diagram illustrating a relationship between a zone and memory blocks according to an embodiment of the present disclosure.

Referring to FIG. 5, each of the plurality of zones may include a plurality of memory blocks BLK. Each of the plurality of zones may correspond to a super block that includes the plurality of memory blocks. For example, first to N-th super blocks Super Block 1 to Super Block N may respectively correspond to the first to N-th zones Zone 1 to Zone N, and each super block may include a plurality of memory blocks. In addition, the number of memory blocks included in each of the plurality of super blocks may be different from each other or may be the same.

The plurality of memory blocks may be controlled in a super block unit. For example, a memory controller 200 may control a memory device 100 to store data in a super block unit. The memory controller 200 may control the memory device 100 to store the data corresponding to the consecutive logical addresses in one super block. In addition, the memory controller 200 may map a logical address and a physical address in the super block unit.

While in the above-described example, one zone corresponds to one super block, embodiments are not limited thereto, and the number of super blocks corresponding to one zone may vary in other embodiments.

Figure 6:
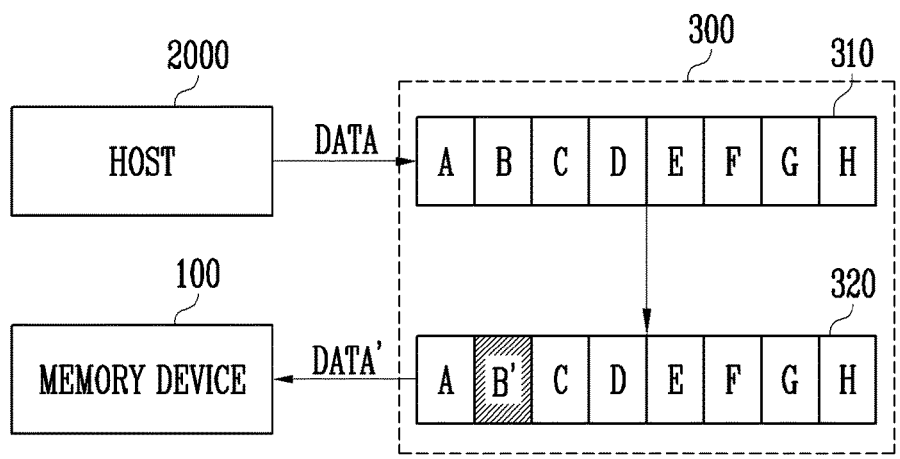
FIG. 6 is a diagram illustrating an error generated during a process in which data is moved according to an embodiment of the present disclosure.

FIG. 6 is a diagram illustrating an error generated during a process in which data is moved according to an embodiment of the present disclosure.

Referring to FIG. 6, a process in which an error is generated in data DATA transmitted from a host 2000 to a buffer memory device 300 is illustrated, in which changed data DATA' is transmitted to a memory device 100 is shown.

The buffer memory device 300 may include a host buffer 310 and a memory buffer 320. The host buffer 310 may temporarily store the data received from the host 2000, and the memory buffer 320 may receive the data from the host buffer 310 and temporarily store the data before providing the data to the memory device 100.

Meanwhile, in the process in which the data is moved from the host buffer 310 to the memory buffer 320, an error may be generated and thus data different from the data DATA write-requested by the host 2000 may be stored in the memory device 100. For example, a BMECC error including a bit flip may be generated in the process in which the data is moved from the host buffer 310 to the memory buffer 320. In order to secure integrity of a storage device 1000 that includes the buffer memory device 300, data that is not intended to be written by the host 2000 is required to be corrected, and the corrected data is required to be stored. However, in the memory device 100 including a zoned name space (ZNS), previously stored data may need to be moved to guarantee continuity of data.

According to an embodiment of the present disclosure, the storage device 1000 may resolve the error generated in the process in which the data is moved, and ensure the continuity of data stored in the memory device 100 through movement of the previously stored data.

Figure 7:
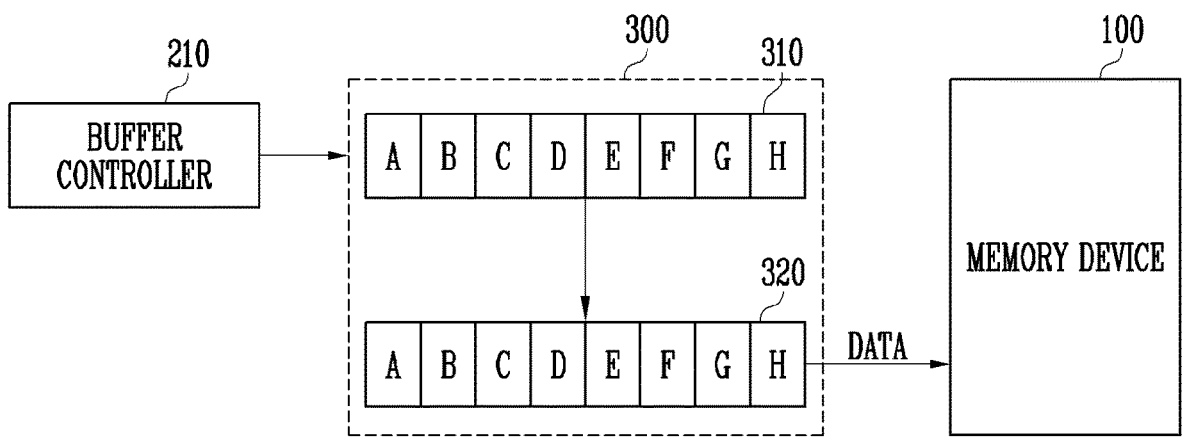
FIG. 7 is a diagram illustrating an operation of a buffer controller and a buffer memory device according to an embodiment of the present disclosure.

FIG. 7 is a diagram illustrating an operation of a buffer controller and a buffer memory device according to an embodiment of the present disclosure.

Referring to FIG. 7, a buffer controller 210 may control a buffer memory device 300 to transmit write data DATA received from a host 2000 to a memory device 100. Specifically, under control of the buffer controller 210, the write data DATA temporarily stored in the host buffer 310 may be moved to the memory buffer 320. In addition, the memory buffer 320 may temporarily store the data received from the host buffer 310 and transmit the write data DATA to the memory device 100.

According to an embodiment of the present disclosure, the buffer controller 210 may control the buffer memory device 300 to remove data that would be normally stored in the memory device 100 from the buffer memory device 300. For example, the memory controller 200 may determine whether an error is generated in the process in which the data is moved from the host buffer 310 to the memory buffer 320. In addition, when an error is not generated in the process in which the data is moved to the memory buffer 320, the buffer controller 210 may control the host buffer 310 to remove the data temporarily stored in the host buffer 310.

Alternatively, the memory controller 200 may determine whether the transmitted data is data that would be normally stored by referring to the data stored in the memory device 100. In addition, when an error is not generated in the process in which the data is stored in the memory device 100, the buffer controller 210 may control the buffer memory device 300 to remove the data temporarily stored in the host buffer 310 and the memory buffer 320.

According to an embodiment of the present disclosure, when an error is generated in the process of moving the data from the host buffer 310 to the memory buffer 320, the buffer controller 210 may control the host buffer 310 to retransmit the write data, including the data in which the error is generated, to the memory buffer 320. In addition, the buffer controller 210 may control the buffer memory device 300 to transmit the retransmitted write data to the memory device 100.

Figure 8:
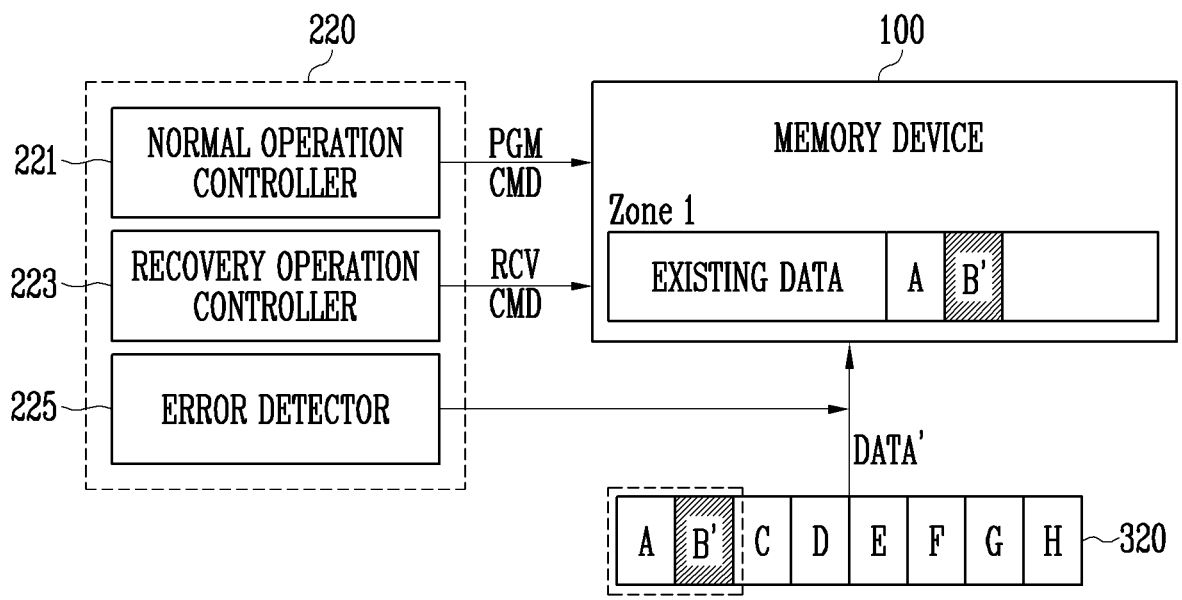
FIG. 8 is a diagram illustrating an operation of a write operation controller according to an embodiment of the present disclosure.

FIG. 8 is a diagram illustrating an operation of a write operation controller according to an embodiment of the present disclosure.

Referring to FIG. 8, a write operation controller 220 may include a normal operation controller 221, a recovery operation controller 223, and an error detector 225.

The normal operation controller 221 may control a memory device 100 to store write data received from a host 2000 in the memory device 100. Specifically, in response to a write request transmitted from the host 2000, the normal operation controller 221 may control the memory device 100 to store the write data corresponding to the write request in any one zone included in the memory device 100. In addition, the normal operation controller 221 may control the memory device 100 to sequentially store data starting from a low or the lowest logical address when logical addresses of the data received from the host 2000 are consecutive.

For example, when the logical address of the write data corresponding to the write request transmitted from the host 2000 has a logical address continuous with the data stored in a specific zone, the normal operation controller 221 may control the memory device 100 to store the write data in the specific zone. For example, when the write data received from the host 2000 has a logical address continuous with the logical address of existing data previously stored in Zone 1, the normal operation controller 221 may control the memory device 100 to store the write data in Zone 1.

The recovery operation controller 223 may control the memory device 100 and a buffer memory device 300 to perform a recovery operation when an error is generated while the write data received from the host 2000 is moved. Here, the recovery operation may mean an operation of storing the existing data that was previously stored in the specific zone and the write data in a new memory block included in the same zone when an error is generated in the process of storing the write data in the specific zone.

The error detector 225 may detect an error generated while the write data received from the host 2000 moves from the host buffer 310 to the memory buffer 320. In an embodiment, the error detector 225 may determine whether a BMECC error is generated by referring to a call-back function for a program or by comparing data stored in the host buffer 310 and the memory buffer 320. Alternatively, the error detector 225 may determine whether the error is generated based on the data transmitted from the buffer memory device 300 to the memory device 100.

In addition, the recovery operation controller 223 may allocate a new memory block group to a specific zone in response to the error detected from the error detector 225. In addition, the recovery operation controller 223 may control the memory device 100 and the buffer memory device 300 to store the existing data and the write data in the new memory block group. For example, when the data DATA' that the host 2000 does not intend is stored in Zone 1, the error detector 225 may detect that an error is generated in the process of moving the data, and the recovery operation controller 223 may transmit a recovery command RCV CMD so that the memory device 100 performs a recovery operation. Here, the recovery command may be a command for controlling a stop to a program operation that is being performed by the memory device 100 and a command to store the existing data previously stored in the memory device 100 and the write data in a new block allocated to the same zone.

The recovery operation controller 223 may divide the write data received from the host 2000 into first data and second data. Here, the first data may be data previously stored in a preset memory block group without an error from among the write data, and the second data may mean data in which an error is detected from among the write data or data stored after the data in which an error is detected. In addition, the recovery operation controller 223 may obtain the first data from the memory device 100 and may obtain the second data from the buffer memory device 300.

In addition, the recovery operation controller 223 may control the memory device 100 to obtain the existing data previously stored in the specific zone before an error is detected from the memory device 100. In addition, the recovery operation controller 223 may control the memory device 100 to store the existing data in the newly allocated memory block group.

The recovery operation controller 223 may control the memory device 100 to store the data according to consecutive logical addresses. In addition, the recovery operation controller 223 may control the memory device 100 to store the write data after storing the existing data in the newly allocated memory block group. That is, the recovery operation controller may determine an order of the program operation of storing data in the memory device 100.

Figure 9:
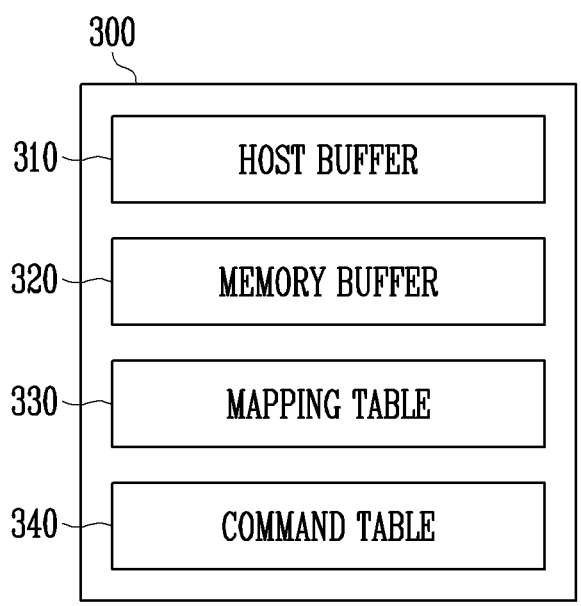
FIG. 9 is a diagram illustrating a buffer memory device according to an embodiment of the present disclosure.

FIG. 9 is a diagram illustrating a buffer memory device according to an embodiment of the present disclosure.

Referring to FIG. 9, a buffer memory device 300 may include a host buffer 310, a memory buffer 320, a mapping table 330, and a command table 340.

The host buffer 310 may temporarily store a data received from the host 2000. Specifically, the host buffer 310 may temporarily store write data from the host 2000 to be stored in any one zone from among a plurality of zones included in a memory device 100. In addition, the host buffer 310 may transmit the temporarily stored data to the memory buffer 320 under the control of the memory controller 200.

The memory buffer 320 may temporarily store data to be provided to the memory device 100. Specifically, the memory buffer 320 may temporarily store the data to be provided to the memory device 100 from among the data stored in the host buffer 310. In addition, the memory buffer 320 may transmit the temporarily stored data to the memory device 100 under the control of the memory controller 200.

The buffer memory device 300 may include a mapping table 330 and a command table 340. The mapping table 330 and the command table 340 are described in detail with reference to FIGS. 10 and 11.

Figure 10:
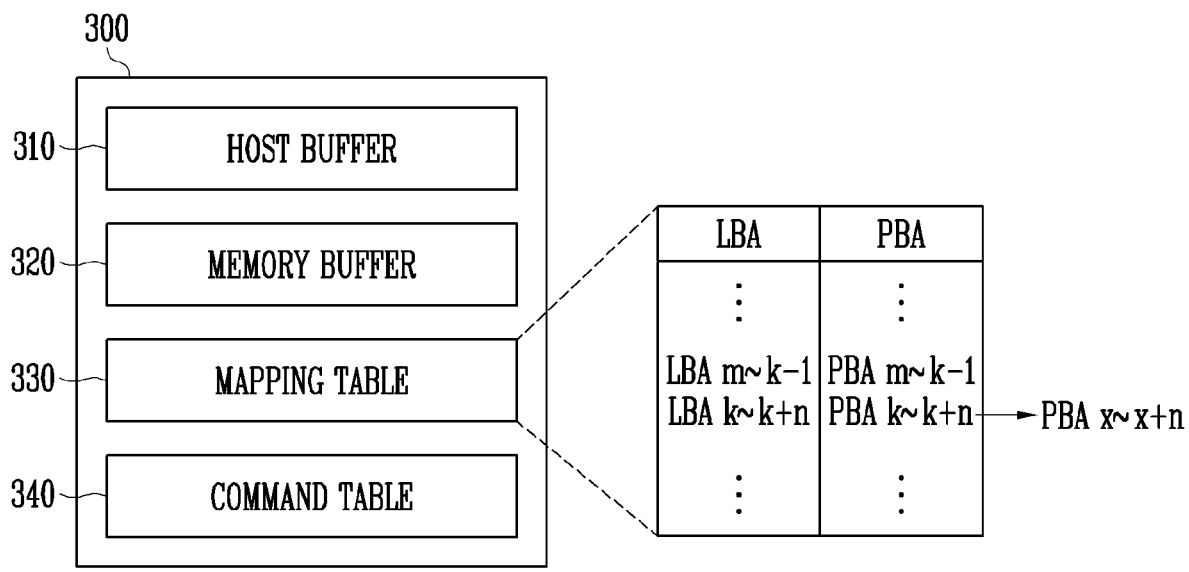
FIG. 10 is a diagram illustrating a mapping table according to an embodiment of the present disclosure.

FIG. 10 is a diagram illustrating a mapping table according to an embodiment of the present disclosure.

Referring to FIG. 10, a mapping table 330 may include information on consecutive logical addresses and physical addresses corresponding thereto. The mapping table 330 may include information on physical addresses "PBA m to PBA k−1" corresponding to consecutive logical addresses "LBA m to LBA k−1" (where m and k are positive integers).

In addition, the mapping table 330 may update mapping information under the control of a memory controller 200. For example, in the mapping table 330, physical addresses corresponding to logical addresses "LBA k to LBA k+n" may be updated from "PBA k to PBA k+n" to "PBA x to PBA x+n" (where x is a positive integer).

FIG. 10 shows a state in which the consecutive logical addresses and the plurality of physical addresses are mapped, but in other embodiments, the mapping table 330 may store information on the consecutive logical addresses and the physical addresses corresponding thereto using a start logical address and a length of the logical address for each program unit.

Figure 11:
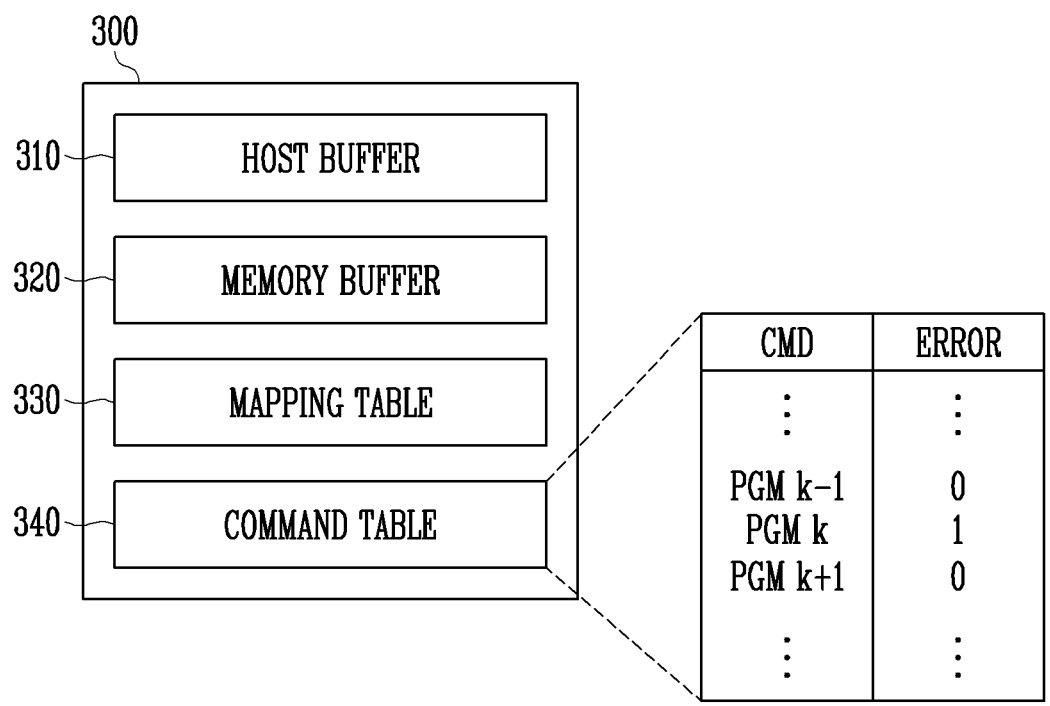
FIG. 11 is a diagram illustrating a command table according to an embodiment of the present disclosure.

FIG. 11 is a diagram illustrating a command table according to an embodiment of the present disclosure.

Referring to FIG. 11, a command table 340 may include command and error information corresponding to the write data. The command table 340 may store command and error information corresponding to write data under the control of a memory controller 200. Specifically, when an error is generated in the write data received from a host 2000, the memory controller 200 may detect the generated error. In addition, the command table 340 may store the command and error information corresponding to the write data under the control of the memory controller 200.

The command table 340 may include the error information. Specifically, the command table 340 may indicate "1" to a command corresponding to the write data in which an error is detected and "0" to a command corresponding to the write data in which an error is not detected. For example, since the error information of write data corresponding to commands "PGM k−1" and "PGM k+1" is "0", it may be identified that an error is not detected. In addition, since the error information of write data corresponding to a command "PGM k" is "1", it may be identified that an error is detected.

Figure 12:
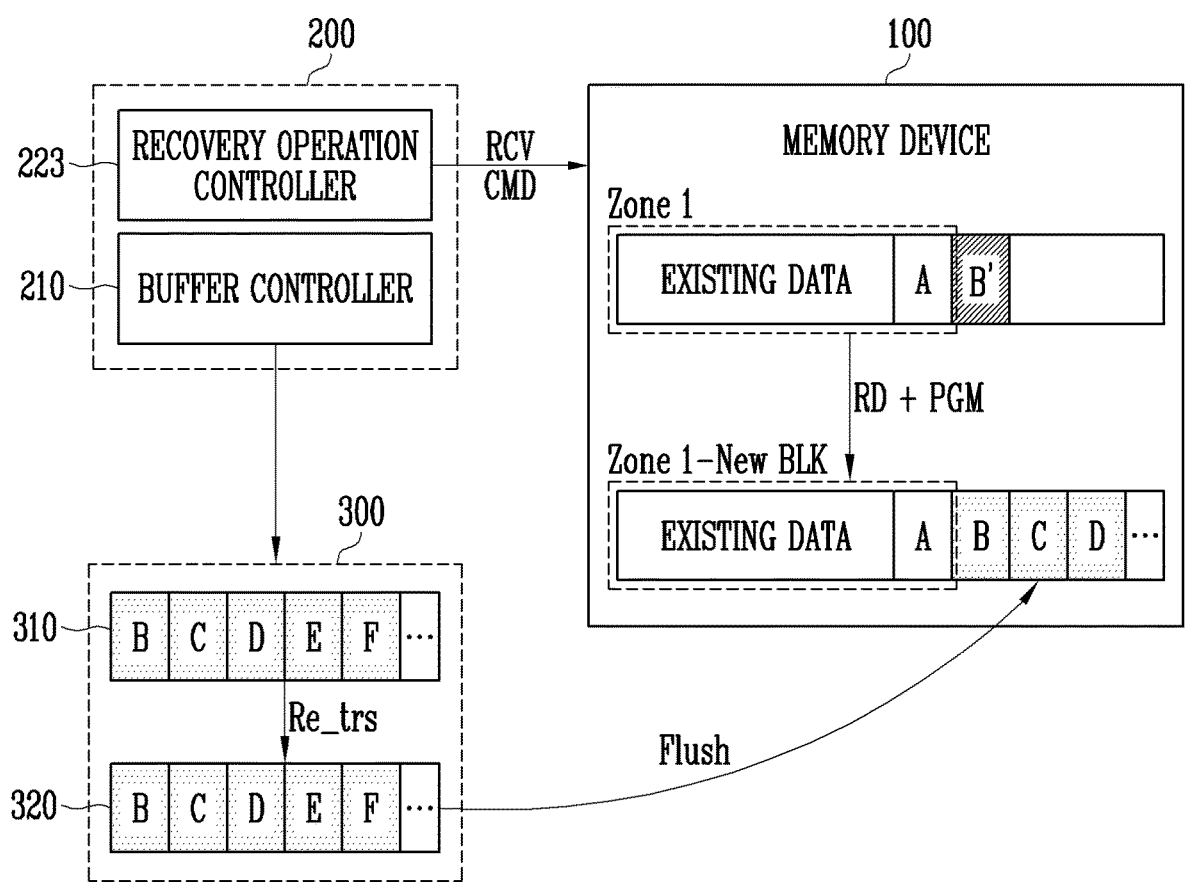
FIG. 12 is a diagram illustrating a recovery operation according to an embodiment of the present disclosure.

FIG. 12 is a diagram illustrating a recovery operation according to an embodiment of the present disclosure.

Referring to FIG. 12, a diagram in which a memory device 100, a memory controller 200, and a buffer memory device 300 perform a recovery operation is shown.

A recovery operation controller 223 may control the memory device 100 and the buffer memory device 300 to perform the recovery operation in response to an error generated during the process in which the write data is moved. The memory device 100 may store the existing data and the write data in a new block under control of the recovery operation controller 223.

Specifically, when an error is generated in data B from among the write data received from the host, resulting in storing of data B', the recovery operation controller 223 may obtain data A, stored without an error from among the existing data previously stored in Zone 1, and the existing data, from the memory device 100. In addition, the recovery operation controller 223 may obtain data B, in which the error is generated in the write data of memory device 100, and data C to F, which are data subsequent to data B, from the buffer memory device 300.

The recovery operation controller 223 may control the memory device 100 and the buffer memory device 300 to sequentially store the existing data and the write data obtained from the memory device 100 and from the buffer memory device 300 in the new block of Zone 1 according to the logical address.

Figure 13:
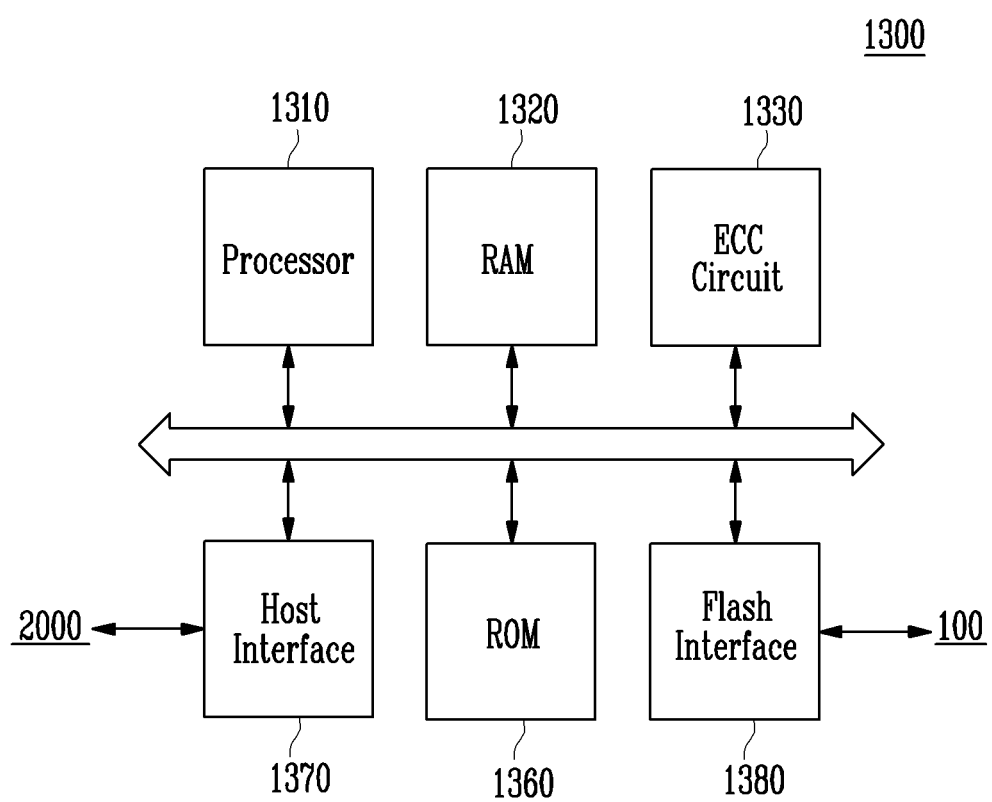
FIG. 13 is a block diagram illustrating a memory controller according to an embodiment of the present disclosure.

FIG. 13 is a block diagram illustrating a memory controller according to an embodiment of the present disclosure.

Referring to FIG. 13, a memory controller 1300 may include a processor 1310, a RAM 1320, an error correction circuit (ECC Circuit) 1330, a ROM 1360, a host interface 1370, and a flash interface 1380. The memory controller 1300 shown in FIG. 13 may be an embodiment of a memory controller 200 shown in FIG. 1.

The processor 1310 may communicate with the host 2000 using the host interface 1370 and perform a logical operation to control an operation of the memory controller 1300. For example, the processor 1310 may load a program command, a data file, a data structure, and the like based on a request received from the host 2000 or an external device, perform various operations, or generate a command and an address. For example, the processor 1310 may generate various commands necessary for a program operation, a read operation, an erase operation, a suspend operation, and a parameter setting operation.

In addition, the processor 1310 may perform a function of a flash translation layer (FTL). The processor 1310 may convert a logical block address (LBA) provided by the host 2000 to a physical block address (PBA) through the FTL. The FTL may receive the LBA and convert the LBA into the PBA using a mapping table. The FTL includes various address mapping methods according to a mapping unit. Examples of a representative address mapping method includes a page mapping method, a block mapping method, and a hybrid mapping method.

In addition, the processor 1310 may generate a command without a request from the host 2000. For example, the processor 1310 may generate a command for background operations such as operations for wear leveling of a memory device 100 and operations for garbage collection of the memory device 100.

The RAM 1320 may be used as a buffer memory, an operation memory, or a cache memory of the processor 1310. In addition, the RAM 1320 may store codes and commands executed by the processor 1310. The RAM 1320 may store data processed by the processor 1310. In addition, the RAM 1320 may be implemented by including a static RAM (SRAM) or a dynamic RAM (DRAM) when the RAM 1320 is implemented.

The error correction circuit 1330 may detect an error during a program operation or a read operation and may correct the detected error. Specifically, the error correction circuit 1330 may perform an error correction operation according to an error correction code (ECC). In addition, the error correction circuit 1330 may perform error correction encoding (ECC encoding) based on data to be written in the memory device 100. Data on which the error correction encoding is performed may be transferred to the memory device 100 through the flash interface 1380. In addition, the error correction circuit 1330 may perform error correction decoding (ECC decoding) on data received from the memory device 100 through the flash interface 1380.

The ROM 1360 may be used as a storage that stores various pieces of information necessary for the operation of the memory controller 1300. Specifically, the ROM 1360 may include a map table, and physical-logical address information and logical-physical address information may be stored in the map table. In addition, the ROM 1360 may be controlled by the processor 1310.

The host interface 1370 may include a protocol for performing data exchange between the host 2000 and the memory controller 1300. Specifically, the host interface 1370 may be configured to communicate with the host 2000 through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol, and a private protocol.

The flash interface 1380 may communicate with the memory device 100 using a communication protocol under control of the processor 1310. Specifically, the flash interface 1380 may communicate the command, the address, and the data with the memory device 100 through a channel. For example, the flash interface 1380 may include a NAND interface.

Figure 14:
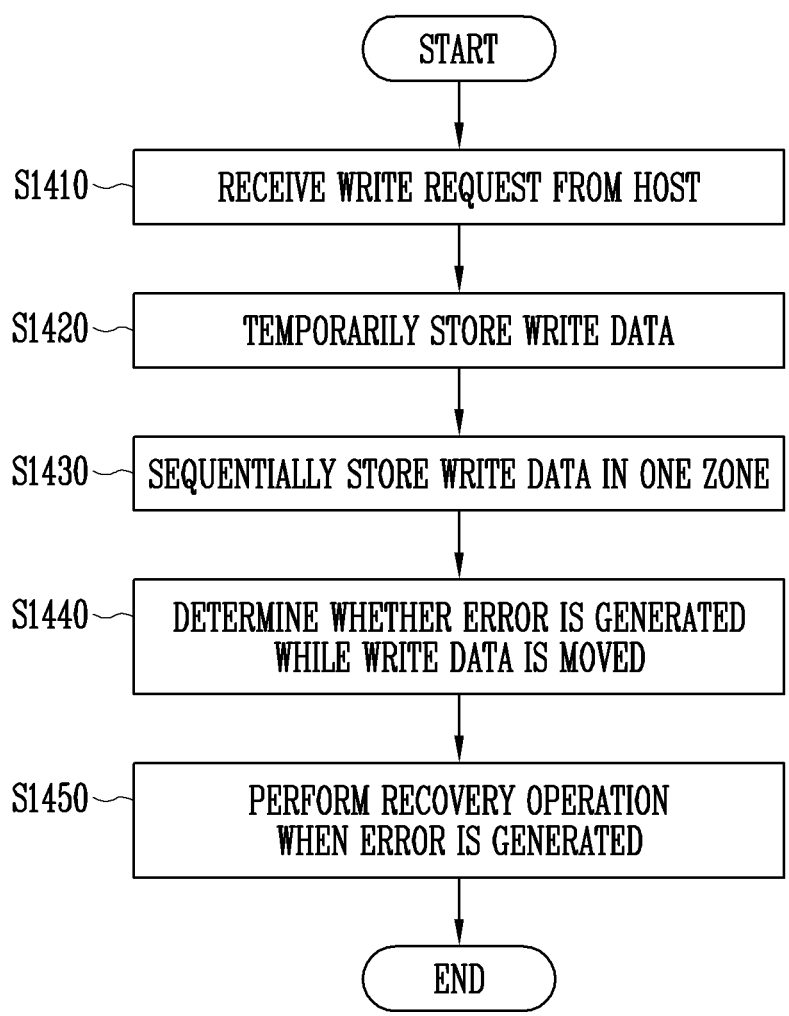
FIG. 14 is a flowchart illustrating a method of operating a storage device according to an embodiment of the present disclosure.

FIG. 14 is a flowchart illustrating a method of operating a storage device according to an embodiment of the present disclosure.

A storage device 1000 may include a memory device 100 including a plurality of memory blocks allocated to a plurality of zones.

In addition, the storage device 1000 may receive a write request from a host 2000 (S1410) and temporarily store write data transmitted from the host 2000 (S1420). Specifically, the storage device 1000 may receive the write request and the write data corresponding to the write request from the host 2000.

In addition, the storage device 1000 may sequentially store the write data in one zone (S1430). Specifically, the storage device 1000 may sequentially store the temporarily stored write data in one zone included in the memory device 100.

The storage device 1000 may determine whether an error is generated while the write data is moved (S1440). For example, an error may be generated when the write data is moved within the buffer memory device 300 included in the storage device 1000, or an error may be generated when write data is transmitted from the buffer memory device 300 to the memory device 100.

In addition, when an error is generated, the storage device 1000 may perform a recovery operation (S1450). Specifically, the storage device 1000 may obtain the write data and existing data previously stored in the first memory block group before the write data is stored. In addition, the storage device 1000 may store the obtained write data and existing data in a second memory block group.

In addition, the storage device 1000 may sequentially store the write data and the existing data, according to the logical address of the write data and the existing data, in the second memory block group.

Figure 15:
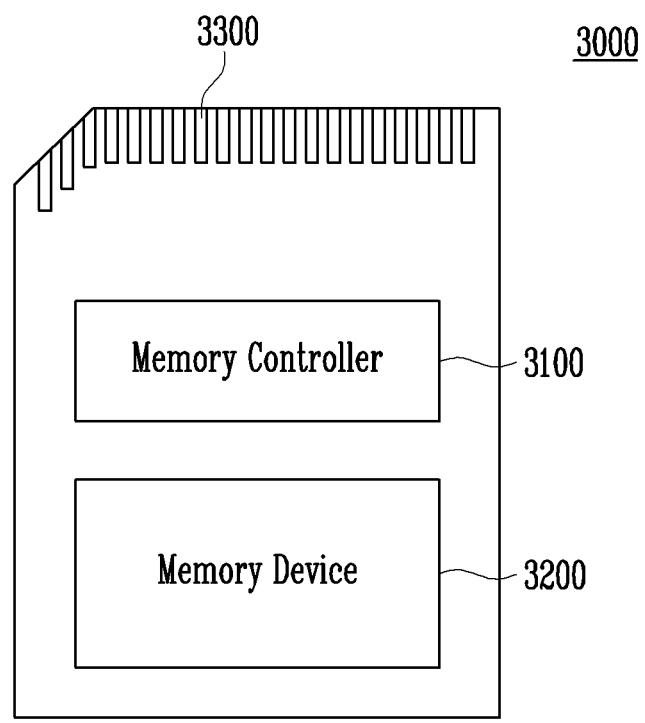
FIG. 15 is a diagram illustrating a memory card system according to an embodiment of the present disclosure.

FIG. 15 is a diagram illustrating a memory card system according to an embodiment of the present disclosure.

Referring to FIG. 15, a memory card system 3000 may include a memory controller 3100, a memory device 3200, and a connector 3300.

The memory controller 3100 may be electrically connected to the memory device 3200, and the memory controller 3100 may be configured to access the memory device 3200. For example, the memory controller 3100 may be configured to control a read operation, a write operation, an erase operation, and a background operation for the memory device 3200. The memory controller 3100 may be configured to provide an interface between the memory device 3200 and a host Host. In addition, the memory controller 3100 may drive firmware for controlling the memory device 3200.

For example, the memory controller 3100 may include components such as a random access memory (RAM), a processor, a host interface, a memory interface, and an error correction circuit.

The memory controller 3100 may communicate with an external device through the connector 3300. The memory controller 3100 may communicate with an external device (for example, the host) according to a specific communication standard. For example, the memory controller 3100 may be configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 3300 may be defined by at least one of the various communication standards described above.

For example, the memory device 3200 may be implemented as various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer-torque magnetic RAM (STT-MRAM).

The memory controller 3100 and the memory device 3200 may be integrated into one semiconductor device to configure a memory card. For example, the memory controller 3100 and the memory device 3200 may be integrated into one semiconductor device to configure a memory card such as a PC (personal computer memory card international association (PCMCIA)) card, a compact flash (CF) card, a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 16:
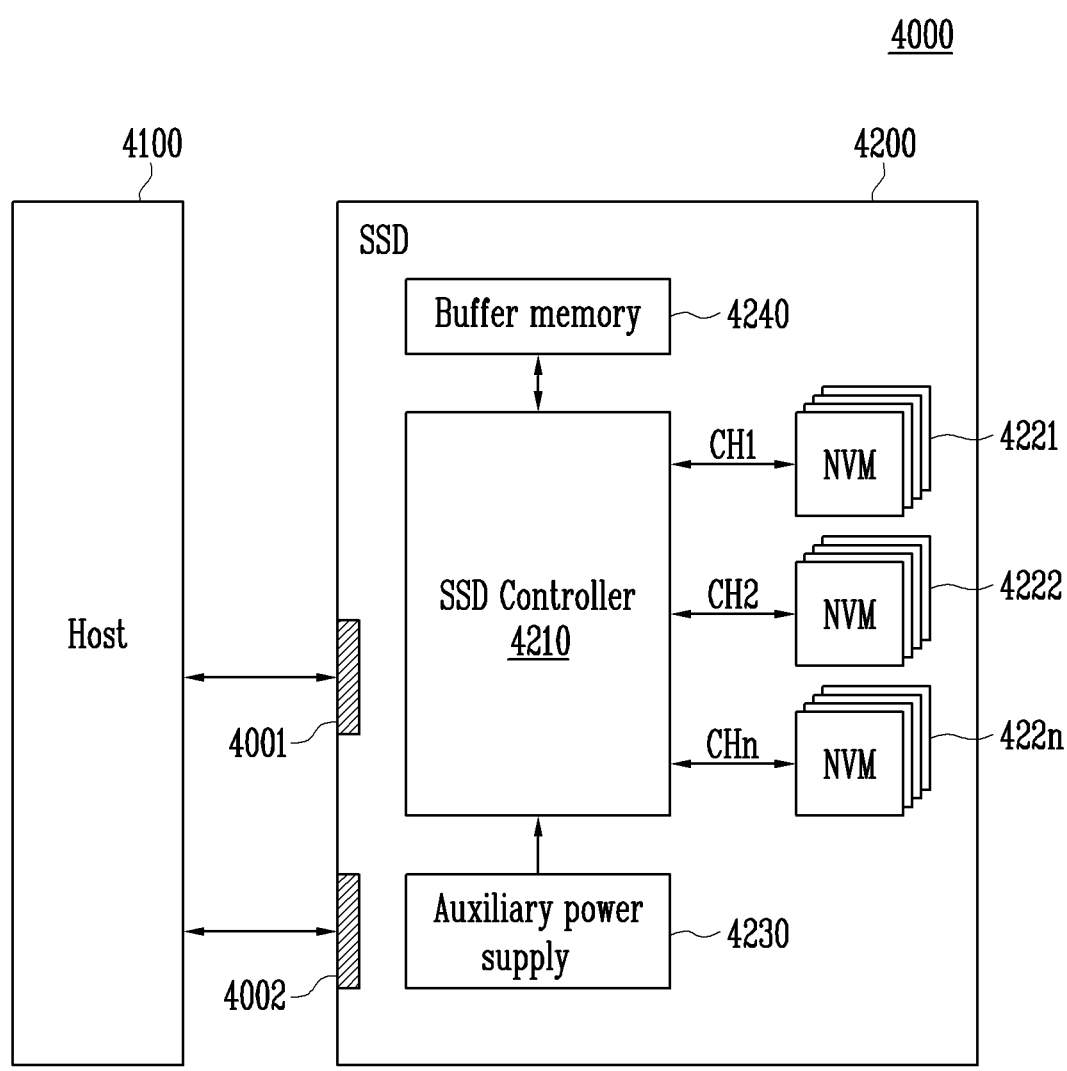
FIG. 16 is a diagram illustrating a solid state drive (SSD) system according to an embodiment of the present disclosure.

FIG. 16 is a diagram illustrating a solid state drive (SSD) system according to an embodiment of the present disclosure.

Referring to FIG. 16, the SSD system 4000 may include a host 4100 and an SSD 4200. The SSD 4200 may exchange a signal SIG with the host 4100 through a signal connector 4001 and receive power PWR through a power connector 4002. The SSD 4200 may include an SSD controller 4210, a plurality of flash memories 4221 to 422n, an auxiliary power supply 4230, and a buffer memory 4240.

In an embodiment, the SSD controller 4210 may perform a function of the memory controller 200 described with reference to FIG. 1. The SSD controller 4210 may control the plurality of flash memories 4221 to 422n in response to the signal SIG received from the host 4100. For example, the signals SIG may be signals based on an interface between the host 4100 and the SSD 4200. For example, the signal SIG may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 4230 may be connected to the host 4100 through the power connector 4002. The auxiliary power supply 4230 may receive the power PWR from the host 4100 and may provide power. The auxiliary power supply 4230 may provide power to the SSD 4200 when power supply from the host 4100 is not smooth. For example, the auxiliary power supply 4230 may be positioned in the SSD 4200 or may be positioned outside of the SSD 4200. For example, the auxiliary power supply 4230 may be positioned on a main board and may provide auxiliary power to the SSD 4200.

The buffer memory 4240 operates as a buffer memory of the SSD 4200. For example, the buffer memory 4240 may temporarily store data received from the host 4100 or data received from the plurality of flash memories 4221 to 422n, or may temporarily store metadata (for example, a mapping table) of the flash memories 4221 to 422n. The buffer memory 4240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 17:
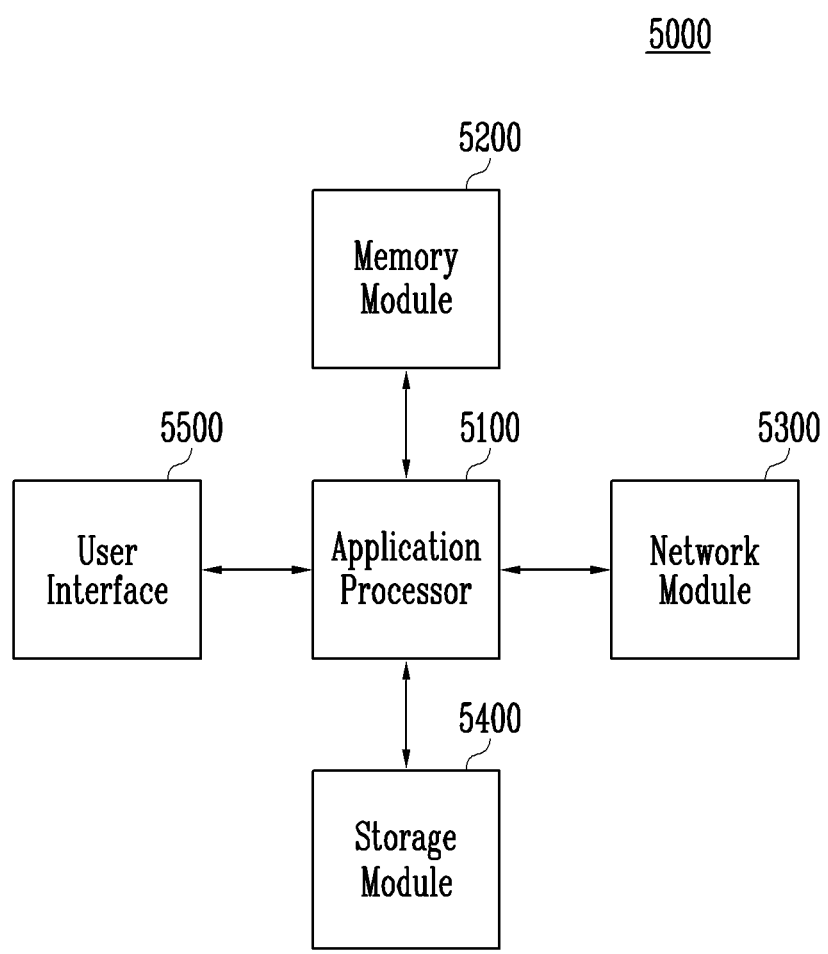
FIG. 17 is a diagram illustrating a user system according to an embodiment of the present disclosure.

FIG. 17 is a diagram illustrating a user system according to an embodiment of the present disclosure.

Referring to FIG. 17, the user system 5000 may include an application processor 5100, a memory module 5200, a network module 5300, a storage module 5400, and a user interface 5500.

The application processor 5100 may drive components, an operating system (OS), a user program, or the like included in the user system 5000. For example, the application processor 5100 may include controllers, interfaces, graphics engines, and the like that control the components included in the user system 5000. The application processor 5100 may be provided as a system-on-chip (SoC).

The memory module 5200 may operate as a main memory, an operation memory, a buffer memory, or a cache memory of the user system 5000. The memory module 5200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 5100 and memory module 5200 may be packaged based on a package on package (POP) and provided as one semiconductor package.

The network module 5300 may communicate with external devices. For example, the network module 5300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and WI-FI. For example, the network module 5300 may be included in the application processor 5100.

The storage module 5400 may store data. For example, the storage module 5400 may store data received from the application processor 5100. Alternatively, the storage module 5400 may transmit data stored in the storage module 5400 to the application processor 5100. For example, the storage module 5400 may be implemented as a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 5400 may be provided as a removable storage device (removable drive), such as a memory card, and an external drive of the user system 5000.

For example, the storage module 5400 may include a plurality of nonvolatile memory devices, and the plurality of nonvolatile memory devices may operate identically to the memory device described with reference to FIG. 1. The storage module 5400 may operate identically to the storage device 1000 described with reference to FIG. 1.

The user interface 5500 may include interfaces for inputting data or an instruction to the application processor 5100 or for outputting data to an external device. For example, the user interface 5500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 5500 may include user output interfaces such as a liquid crystal display (LCD), an organic light emitting diode (OLED) display device, an active matrix OLED (AMOLED) display device, an LED, a speaker, and a monitor.

What is claimed is:

1. A storage device comprising:
   a memory device including a plurality of zones, each of the plurality of zones having a plurality of memory blocks that forms a memory block group;
   a buffer memory device including a host buffer, receiving write data from a host to be stored in one of the plurality of zones, and a memory buffer temporarily storing the write data transmitted from the host buffer;
   a buffer controller configured to control the buffer memory device to transmit the write data from the memory buffer to the memory device; and
   a write operation controller configured to control the memory device to store the write data transmitted from the buffer memory device in the one of the plurality of zones, which includes a previously stored data in a first memory block group,
   wherein the write operation controller controls the memory device to obtain the previously stored data and a corrected write data and to store the previously stored data and the corrected write data in a second memory block group after the write operation controller detects an error in the write data, and
   wherein the write operation controller controls the memory device to obtain first data and the previously stored data from the memory device, and controls the buffer memory device to obtain second data from the host buffer.

2. The storage device of claim 1, wherein the write operation controller comprises:

an error detector that detects the error in the write data; and
a recovery operation controller that controls the memory device and the buffer memory device to perform a recovery operation of storing the previously stored data and the corrected write data in the second memory block group in response to the detected error,
wherein the error is generated while the write data is transmitted from the host buffer to the memory buffer or while the write data is transmitted from the buffer memory device and stored in the memory device in a program operation.

3. The storage device of claim 2, wherein the recovery operation controller controls the memory device to stop the program operation and perform the recovery operation when the error is detected while performing the program operation.

4. The storage device of claim 2, wherein the recovery operation controller divides the write data into the first data and the second data,
   the first data is included in the previously stored data,
   the second data does not include the error,
   the error is detected in a data corresponding to a copy of the second data, and
   the corrected write data comprises the first data and the second data.

5. The storage device of claim 4, wherein the recovery operation controller controls the memory device to store the second data in the second memory block group after storing the first data in the second memory block group.

6. The storage device of claim 2, wherein the recovery operation controller configured to:
   determine an order of the program operation of storing data received from the host in the memory device; and
   generate a recovery command including a command instructing to stop the program operation performed by the memory device, a command instructing to read data stored in the memory device, and a command instructing the program operation.

7. The storage device of claim 1, wherein when logical addresses of data received from the host are consecutive, the write operation controller controls the memory device to sequentially store data starting from the lowest logical address.

8. The storage device of claim 7, wherein logical addresses of the previously stored data and the write data are consecutive, and
   the write operation controller controls the memory device to store the write data in the second memory block group after storing the previously stored data in the second memory block group.

9. The storage device of claim 1, wherein the buffer memory device comprises:
   a mapping table configured to store mapping information of a logical address and a physical address of data stored in the memory device; and
   a command table including error information for a command corresponding to the write data.

10. The storage device of claim 9, wherein the mapping table updates the mapping information of the logical address and the physical address corresponding to the previously stored data and the write data after the previously stored data and the write data are stored in the second memory block group.

11. The storage device of claim 10, wherein the corrected write data further comprises subsequent data and the write operation controller stores the subsequent data according to the updated mapping information.

12. The storage device of claim 9, wherein the buffer controller controls the host buffer to remove the write data temporarily stored in the host buffer based on the command table.

13. The storage device of claim 9, wherein the buffer controller controls the host buffer to retransmit the write data to the memory buffer based on the command table, and controls the memory buffer to transmit the retransmitted write data to the memory device.

14. The storage device of claim 1, wherein the write operation controller allocates the second memory block group to the any one of the plurality of zones in response to the error.

15. A method of operating a storage device including a memory device including a plurality of memory blocks allocated to a plurality of zones, the method comprising:
   receiving a write request including a write data from a host;
   temporarily storing the write data transmitted from the host;
   sequentially storing the temporarily stored write data in one of the plurality of zones in the memory device;
   determining whether an error is generated while the write data is moved; and
   performing a recovery operation when an error is generated,
   wherein performing the recovery operation comprises:
   obtaining the write data and existing data that was previously stored in a first memory block group before the write data is stored; and
   storing the write data and the existing data in a second memory block group, and
   wherein obtaining the write data and the existing data comprises:
   obtaining, from the memory device, first data previously stored in the first memory block group without an error from among the existing data and the write data; and
   obtaining second data that does not include the first data from among the write data in a buffer memory device.

16. The method of claim 15, wherein storing the write data and the existing data in the second memory block group comprises sequentially storing the write data and the existing data according to logical addresses of the write data and the existing data.

17. The method of claim 15, wherein performing the recovery operation further comprises allocating the second memory block group to the any one of the plurality of zones.

* * * * *